(12) United States Patent
Usa (10) Patent No.: US 11,186,339 B2
(45) Date of Patent: Nov. 30, 2021

(54) VEHICLE BODY FRAME STRUCTURE FOR SADDLE RIDING VEHICLE

(71) Applicant: HONDA MOTOR CO., LTD., Tokyo (JP)

(72) Inventor: Masanori Usa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 221 days.

(21) Appl. No.: 16/508,853

(22) Filed: Jul. 11, 2019

(65) Prior Publication Data

US 2020/0070925 A1 Mar. 5, 2020

(30) Foreign Application Priority Data

Aug. 30, 2018 (JP) .............................. JP2018-161477

(51) Int. Cl.
*B62K 11/04* (2006.01)
*B62M 7/02* (2006.01)
(Continued)

(52) U.S. Cl.
CPC .............. *B62K 11/04* (2013.01); *B62K 25/20* (2013.01); *B62J 43/00* (2020.02); *B62K 19/30* (2013.01); *B62M 7/02* (2013.01)

(58) Field of Classification Search
CPC .................................. B62K 25/20; B62J 43/00
(Continued)

(56) References Cited

U.S. PATENT DOCUMENTS 4,444,856 A * 4/1984 Uehara ................. H01M 50/112
429/163
4,476,951 A * 10/1984 Ito ............................ B62M 7/02
123/179.19
(Continued)

FOREIGN PATENT DOCUMENTS

DE 3153356 C2 * 9/1988 ............. B62K 11/04
DE 69019945 T2 10/1995
(Continued)

OTHER PUBLICATIONS

Indian Office Action dated Oct. 7, 2020, includes English text, 6 pages.
(Continued)

*Primary Examiner* — Minnah L Seoh
*Assistant Examiner* — Myles A Harris
(74) *Attorney, Agent, or Firm* — Rankin, Hill & Clark LLP (57) ABSTRACT

In a vehicle body frame structure for a saddle riding vehicle, including an engine, a vehicle body frame that supports the engine, and a swing arm that supports a rear wheel. The vehicle body frame includes a head pipe, a main frame that extends from the head pipe toward a rear of the vehicle along a path superior to the engine, a down frame that extends from the head pipe downwardly along a path anterior to the engine, a lower frame that extends from a lower portion of the down frame toward the rear of the vehicle along a path inferior to the engine, and a pivot support member that extends from a rear portion of the lower frame upwardly up to a position of a pivot shaft that rotatably supports the swing arm. The pivot support member includes a pivot support portion that supports the pivot shaft.

15 Claims, 6 Drawing Sheets

(51) Int. Cl.
*B62J 43/00* (2020.01)
*B62K 25/20* (2006.01)
*B62K 19/30* (2006.01)

(58) Field of Classification Search
USPC .......................................................... 180/227
See application file for complete search history.

(56) References Cited

U.S. PATENT DOCUMENTS

| | | | | |
|---|---|---|---|---|
| 4,487,285 A | * | 12/1984 | Tomita | B62M 7/02 |
| | | | | 180/228 |
| 7,270,210 B2 | * | 9/2007 | Katsura | B62K 11/04 |
| | | | | 180/219 |
| 9,505,460 B2 | * | 11/2016 | Ishida | B62K 25/283 |
| 9,751,583 B2 | * | 9/2017 | Ishida | B62K 25/00 |
| 2003/0079926 A1 | * | 5/2003 | Taniguchi | B62K 11/04 |
| | | | | 180/219 |
| 2003/0106733 A1 | * | 6/2003 | Keller | B62K 11/04 |
| | | | | 180/228 |
| 2005/0006163 A1 | * | 1/2005 | Brendelson | B62M 7/02 |
| | | | | 180/227 |
| 2006/0065462 A1 | * | 3/2006 | Ishida | B62K 25/20 |
| | | | | 180/227 |
| 2007/0125585 A1 | * | 6/2007 | Takahashi | B62K 11/04 |
| | | | | 180/219 |
| 2009/0230654 A1 | | 9/2009 | Yuliang et al. | |
| 2012/0267182 A1 | * | 10/2012 | Saeki | B62K 19/30 |
| | | | | 180/219 |
| 2014/0361512 A1 | * | 12/2014 | Ishida | B62K 25/283 |
| | | | | 280/284 |
| 2015/0068830 A1 | * | 3/2015 | Nakata | F28F 9/001 |
| | | | | 180/229 |
| 2016/0288860 A1 | * | 10/2016 | Tani | F02M 35/10013 |
| 2017/0114702 A1 | * | 4/2017 | Okita | F01P 7/165 |
| 2018/0043967 A1 | * | 2/2018 | Ore | B62K 11/04 |
| 2019/0077482 A1 | * | 3/2019 | Morotomi | B62K 11/04 |
| 2019/0176924 A1 | * | 6/2019 | Iwata | B62K 25/20 |
| 2019/0305276 A1 | * | 10/2019 | Suzuki | H01M 50/20 |
| 2020/0102034 A1 | * | 4/2020 | Mayuzumi | B62J 25/06 |

FOREIGN PATENT DOCUMENTS

| | | | | |
|---|---|---|---|---|
| DE | 69421380 T2 | | 5/2000 | |
| DE | 69721157 T2 | | 11/2003 | |
| EP | 0985600 A1 | * | 3/2000 | B62K 11/04 |
| EP | 2955088 A1 | * | 12/2015 | B62J 35/00 |
| EP | 3251932 A1 | * | 12/2017 | B62J 43/00 |
| EP | 3251932 A1 | | 12/2017 | |
| IN | WO-2020089947 A1 | * | 5/2020 | B62K 11/04 |
| JP | H0173482 | * | 11/1987 | B62K 11/02 |
| JP | 1-73482 | | 5/1989 | |
| JP | 5-338575 | | 12/1993 | |
| JP | 3187533 B2 | * | 7/2001 | |
| JP | 2006-273168 | | 10/2006 | |
| JP | 6479116 B1 | * | 3/2019 | B62J 45/00 |
| WO | WO-2018047060 A1 | * | 3/2018 | B62K 11/04 |

OTHER PUBLICATIONS

Japanese Office Action dated Feb. 25, 2020, Application No. 2018-161477; English machine translation included, 11 pages.
German Search Report with English translation dated Apr. 17, 2020, 12 pages.
German Examination Report with English translation dated Apr. 20, 2020, 11 pages.

* cited by examiner

VEHICLE BODY FRAME STRUCTURE FOR SADDLE RIDING VEHICLE

INCORPORATION BY REFERENCE

The present application claims priority under 35 U.S.C. § 119 to Japanese Patent Application No.2018-161477 filed on Aug. 30, 2018. The content of the application is incorporated herein by reference in its entirety.

TECHNICAL FIELD

The present invention relates to a vehicle body frame structure for a saddle riding vehicle.

BACKGROUND ART

A known vehicle body frame structure for a saddle riding vehicle includes a main frame that extends from a head pipe and a pivot frame that supports a pivot shaft of a swing arm, the main frame and the pivot frame being individually fastened to an engine (see, for example, Patent Document 1). In the configuration disclosed in Patent Document 1, the main frame is not connected with the pivot frame and thus rigidity of the engine greatly contributes to rigidity of a vehicle body frame.

PRIOR ART DOCUMENT

Patent Document

[Patent Document 1]
Japanese Patent Laid-Open No. 2006-273168

SUMMARY OF THE INVENTION

Problem to be Solved by the Invention

When the engine is used as part of the vehicle body frame structure as in the known vehicle body frame structure, however, adjustment for achieving favorable rigidity balance of the vehicle body frame is difficult due to some restrictions on the shape of the engine.

The present invention has been made in view of the foregoing situation and it is an object of the present invention to achieve favorable rigidity balance of a vehicle body frame in a vehicle body frame structure for a saddle riding vehicle.

Means for Solving the Problem

An aspect of the present invention provides a vehicle body frame structure for a saddle riding vehicle, including an engine (10), a vehicle body frame (F) that supports the engine (10), and a swing arm (12) that supports a rear wheel (3). In the vehicle body frame structure for a saddle riding vehicle, the vehicle body frame (F) includes a head pipe (15), a main frame (16) that extends from the head pipe (15) toward a rear of the vehicle along a path superior to the engine (10), a down frame (17) that extends from the head pipe (15) downwardly along a path anterior to the engine (10), a lower frame (18) that extends from a lower portion of the down frame (17) toward the rear of the vehicle along a path inferior to the engine (10), and a pivot support member (19) that extends from a rear portion of the lower frame (18) upwardly up to a position of a pivot shaft (27) that rotatably supports the swing arm (12). In the vehicle body frame structure for a saddle riding vehicle, the pivot support member (19) includes a pivot support portion (62) that supports the pivot shaft (27).

In the above configurations, preferably, the vehicle body frame structure for a saddle riding vehicle further includes a rear suspension (28) that suspends the swing arm (12) on the vehicle body frame (F), and the rear suspension (28) has a lower end (28b) supported by the pivot support member (19) via a link (29) and an upper end (28a) supported by a rear end portion of the main frame (16).

In the above configurations, preferably, the main frame (16) is a single frame extending from the head pipe (15), and the upper end (28a) of the rear suspension (28) is supported by the rear end portion of the main frame (16).

In the above configurations, preferably, the vehicle body frame structure for a saddle riding vehicle further includes engine fixing portions (55, 56, 64) to which the engine (10) is fixed, disposed in the down frame (17), the lower frame (18), and the pivot support member (19), individually.

In the above configurations, preferably, the vehicle body frame structure for a saddle riding vehicle further includes an electric component fixing portion (53a) to which an electric component (38) is fixed, disposed at a rear portion of the main frame (16), and the electric component (38) is surrounded by the engine (10) and the main frame (16).

In the above configurations, preferably, the engine (10) has an engine-side fixing portion (33c) to which the electric component (38) is fixed.

In the above configurations, preferably, the vehicle body frame structure for a saddle riding vehicle further includes an upper portion fixing portion (70) that connects the vehicle body frame (F) with an upper portion of the engine (10), and the electric component (38) is fixed to the upper portion fixing portion (70).

In the above configurations, preferably, the vehicle body frame structure for a saddle riding vehicle further includes a seat frame (20) that extends from a rear end portion of the main frame (16) toward the rear of the vehicle. In the vehicle body frame structure for a saddle riding vehicle, preferably, the main frame (16) includes a cross frame portion (51) that extends laterally and outwardly and that is disposed at the rear end portion, and the seat frame (20) is connected with the cross frame portion (51).

In the above configurations, preferably, the cross frame portion (51) and the seat frame (20) fall within a width of the engine (10) in a plan view.

In the above configurations, preferably, the vehicle body frame structure for a saddle riding vehicle further includes a rear portion engine fixing portion (53a) to which the engine (10) is fixed, disposed at the cross frame portion (51).

In the above configurations, preferably, the vehicle body frame (F) includes a frame-shaped portion (14a) that surrounds the engine (10) in a vehicle side view, and the frame-shaped portion (14a) has an open portion (66) that represents an opening between a rear end portion of the main frame (16) and an upper end portion of the pivot support member (19) in the vehicle side view.

In the above configurations, preferably, the rear end portion of the main frame (16) extends up to a position in height of an upper end portion (33b) of a transmission case portion (33) disposed at a rear portion of the engine (10).

In the above configurations, preferably, a change rod (68) that connects a transmission (33d) of the engine (10) with a shift pedal (41) passes through the open portion (66) in a vehicle side view.

Effects of the Invention

In accordance with the aspect of the present invention, the vehicle body frame structure for a saddle riding vehicle includes the engine, the vehicle body frame that supports the engine, and the swing arm that supports the rear wheel. The vehicle body frame includes the head pipe, the main frame that extends from the head pipe toward the rear of the vehicle along a path superior to the engine, the down frame that extends from the head pipe downwardly along a path anterior to the engine, the lower frames that extend from the lower portion of the down frame toward the rear of the vehicle along a path inferior to the engine, and the pivot support member that extends from the rear portions of the lower frames upwardly up to a position of the pivot shaft that rotatably supports the swing arm. The pivot support member includes the pivot support portions that support the pivot shaft.

Through the foregoing configurations, the vehicle body frame includes the pivot support member that includes the pivot support portions, and the pivot support member extends from the rear portions of the lower frames upwardly to the position of the pivot shaft. This arrangement results in the pivot support member not being connected with the vehicle body frame superior to the pivot support member and rigidity of the vehicle body frame can be reduced to some extent. Favorable rigidity balance of the vehicle body frame can thus be achieved. Additionally, weight of the vehicle body frame can be reduced.

In the above configurations, the vehicle body frame structure for a saddle riding vehicle may further include the rear suspension that suspends the swing arm on the vehicle body frame, and the rear suspension may have the lower end supported by the pivot support member via the link and have the upper end supported by the rear end portion of the main frame.

Through the foregoing configurations, a load on the side of the lower end of the rear suspension is transmitted to the pivot support member via the link and a load on the side of the upper end of the rear suspension is transmitted to the rear end portion of the main frame. Thus, a load of vertical motion or torsion from the side of the rear suspension can be efficiently borne by the vehicle body frame, so that favorable rigidity balance of the vehicle body frame can be achieved.

In the above configurations, the main frame may be a single frame extending from the head pipe and the upper end of the rear suspension may be supported by the rear end portion of the main frame.

Through the foregoing configurations, because the main frame is a single part, the vehicle body frame can be formed to be slim in the vehicle width direction. Additionally, the load on the side of the upper end of the rear suspension can be directly transmitted to the single main frame, so that favorable response of the vehicle body frame to the load can be achieved.

In the above configurations, the engine fixing portions may be disposed in the down frame, the lower frames, and the pivot support member.

Through the foregoing configurations, because weight of the engine is borne by the down frame, the lower frames, and the pivot support member, the position of a center of deflection when the vehicle body frame is flexed by the load can be disposed at an even lower position, so that the center of gravity can be lowered. The load borne by the main frame can also be reduced and the degree of freedom in designing the main frame can be enhanced.

In the above configurations, the vehicle body frame structure may further include the electric component fixing portion to which the electric component is fixed, disposed at the rear portion of the main frame and the electric component may be surrounded by the engine and the main frame.

Through the foregoing configurations, the electric component can be supported by the main frame via the electric component fixing portion and the electric component can be protected by the main frame and the engine.

In the above configurations, the vehicle body frame structure may further include the engine-side fixing portion to which the electric component is fixed.

Through the foregoing configuration, the electric component can be rigidly fixed by the engine-side fixing portion disposed in the engine.

In the above configurations, the vehicle body frame structure may further include the upper portion fixing portion that connects the vehicle body frame with the upper portion of the engine, and the electric component may be fixed to the upper portion fixing portion.

Through the foregoing configurations, the electric component can be fixed in place through a simple structure using the upper portion fixing portion that connects the upper portion of the engine with the vehicle body frame.

In the above configurations, the vehicle body frame structure may further include the seat frame that extends from the rear end portion of the main frame toward the rear of the vehicle, the main frame may include the cross frame portion that extends laterally and outwardly and that is disposed at the rear end portion, and the seat frame may be connected with the cross frame portion.

Through the foregoing configurations, because the seat frame is connected with the cross frame portion that extends laterally and outwardly from the rear end portion of the main frame, the seat frame can have a certain lateral width even with the main frame built to be slim.

In the above configurations, the cross frame portion and the seat frame may fall within a width of the engine in a plan view.

Through the foregoing configuration, the vehicle body frame can be built to have a slim width and the saddle riding vehicle can provide greater ease of reach of feet to the ground.

In the above configurations, the vehicle body frame structure may further include the rear portion engine fixing portion to which the engine is fixed and which is disposed at the cross frame portion.

Through the foregoing configuration, the engine can be fixed via the rear portion engine fixing portion, using the cross frame portion that connects the seat frame with the main frame.

In the above configurations, the vehicle body frame may include the frame-shaped portion that surrounds the engine in a vehicle side view, and the frame-shaped portion may have the open portion that represents an opening between the rear end portion of the main frame and the upper end portion of the pivot support member in the vehicle side view.

Through the foregoing configurations, the vehicle body frame that includes the frame-shaped portion surrounding the engine in the vehicle side view can flex to some extent to achieve favorable rigidity balance, because the frame-shaped portion is open between the rear end portion of the main frame and the upper end portion of the pivot support member. Additionally, the open portion contributes to reduction in weight of the vehicle body frame and to a slim shape at the open portion in the vehicle body frame. The saddle riding vehicle can provide greater ease of reach of feet to the ground.

In the above configurations, the rear end portion of the main frame may extend downwardly up to the position in height of the upper end portion of the transmission case portion disposed at the rear portion of the engine.

Through the foregoing configurations, the vehicle body frame has an open portion between the main frame that extends up to the position in height of the upper end portion of the transmission case portion and the pivot support member that extends upwardly toward the position of the pivot shaft. As a result, the portion between the position in height of the upper end portion of the transmission case portion and the position of the pivot shaft can be formed to be slim and reduction in weight of the vehicle body frame can be achieved.

In the above configurations, the change rod that connects the operation input portion of the transmission of the engine with the shift pedal may pass through the open portion in a vehicle side view.

Through the foregoing configuration, because of the change rod passing through the open portion in the vehicle body frame, the vehicle body frame is less likely to hamper disposition of the change rod, so that the change rod can be disposed easily.

MODES FOR CARRYING OUT THE INVENTION

Specific embodiments to which the present invention is applied will be described below with reference to the accompanying drawings. Throughout the descriptions given hereunder, expressions indicating directions including front and rear, right and left, and upper and lower denote directions relative to a vehicle body unless otherwise specified. In the drawings, an arrow FR indicates an anterior direction of the vehicle body, an arrow UP indicates a superior direction of the vehicle body, and an arrow LH indicates a leftward direction of the vehicle body.

First Embodiment

Figure 1:
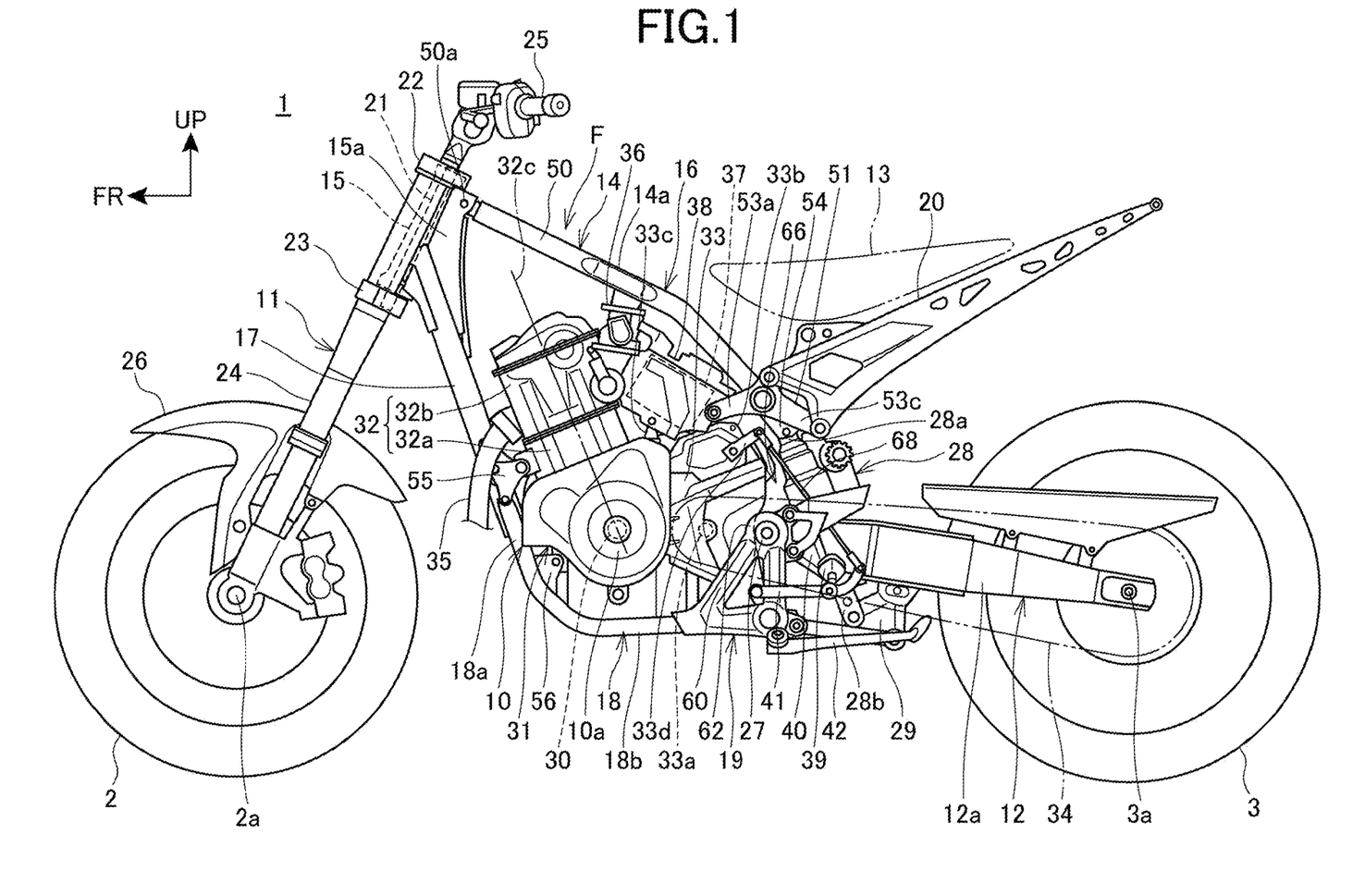
FIG. 1 is a left side elevation view of a motorcycle according to a first embodiment of the present invention.
Figure 2:
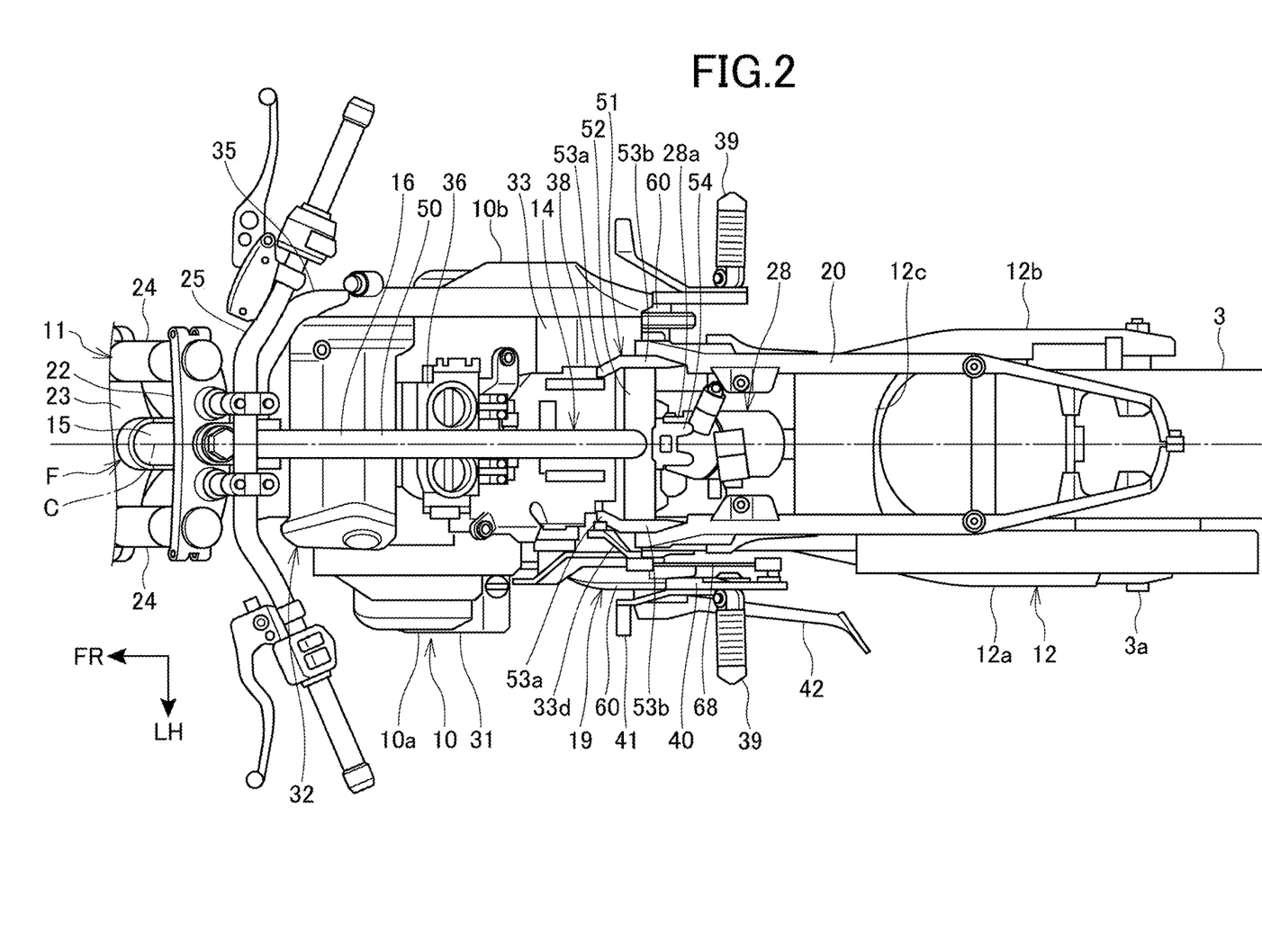
FIG. 2 is a plan view of the motorcycle, as viewed from above.

FIG. 1 is a left side elevation view of a motorcycle 1 according to a first embodiment of the present invention. FIG. 2 is a plan view of the motorcycle 1, as viewed from above.

The motorcycle 1 represents a vehicle that includes a vehicle body frame F. In the motorcycle 1, an engine 10 as a power unit is supported on the vehicle body frame F, a steering system 11, which steerably supports a front wheel 2, is steerably supported at a front end of the vehicle body frame F, and a swing arm 12, which supports a rear wheel 3, is disposed on the side of a rear portion of the vehicle body frame F.

The motorcycle 1 is a saddle riding vehicle in which an occupant straddles a seat 13. The seat 13 is disposed at a position superior to the rear portion of the vehicle body frame F.

The vehicle body frame F includes a front-portion frame 14 and a seat frame 20. The front-portion frame 14 supports the engine 10 and the steering system 11. The seat frame 20 extends rearwardly from the front-portion frame 14.

The front-portion frame 14 includes a head pipe 15, a main frame 16, a down frame 17, a pair of left and right lower frames 18, and a pivot support member 19. The main frame 16 extends from the head pipe 15 downwardly toward the rear. The down frame 17 extends from the head pipe 15 downwardly toward the rear along a path inferior to the main frame 16. The lower frames 18 extend from a lower portion of the down frame 17 toward the rear. The pivot support member 19 extends from a rear portion of the lower frames 18 upwardly.

The seat frame 20 extends from a rear portion of the main frame 16 upwardly toward the rear to thereby support the seat 13.

The steering system 11 includes a steering shaft 21, a top bridge 22, a bottom bridge 23, a pair of front forks 24, and a steering handlebar 25. The steering shaft 21 is journaled by the head pipe 15. The top bridge 22 is fixed to an upper end of the steering shaft 21. The bottom bridge 23 is fixed to a lower end of the steering shaft 21. The front forks 24 are disposed on either lateral side of the head pipe 15 and supported by the top bridge 22 and the bottom bridge 23. The handlebar 25 is fixed to the top bridge 22.

The front wheel 2 is journaled by an axle 2a, which extends across lower end portions of the front forks 24.

A fender 26 is mounted on the front forks 24.

The swing arm 12 includes a pair of left and right arm portions 12a and 12b and a connection member 12c. The arm portions 12a and 12b extend along a vehicle fore-aft direction. The connection member 12c connects front portions of the arm portions 12a and 12b in a vehicle width direction at a position anterior to the rear wheel 3.

The arm portions 12a and 12b of the swing arm 12 have front end portions journaled by a pivot shaft 27, which is supported by the pivot support member 19. The swing arm 12 thereby oscillates vertically about the pivot shaft 27. The pivot shaft 27 extends horizontally in the vehicle width direction.

The rear wheel 3 is journaled by an axle 3a, which is disposed at rear end portions of the arm portions 12a and 12b.

The motorcycle 1 includes a rear suspension 28. The rear suspension 28 suspends the swing arm 12 on the vehicle body frame F.

The rear suspension 28 has an upper end 28a connected with a rear end portion of the main frame 16.

The rear suspension 28 extends downwardly between the left and right arm portions 12a and 12b. The rear suspension 28 has a lower end 28b connected with a link 29, which is disposed inferior to the arm portions 12a and 12b.

The link 29 has a rear portion connected with a lower surface portion of the connection member 12c of the swing arm 12 and a front portion connected with the pivot support member 19. Specifically, the rear suspension 28 has the lower end 28b supported by the pivot support member 19 of the vehicle body frame F via the link 29.

The engine 10 includes a crankcase 31 and a cylinder portion 32. The crankcase 31 supports a crankshaft 30, which extends in the vehicle width direction. The cylinder portion 32 extends from a front portion of the crankcase 31 upwardly.

The cylinder portion 32 includes a cylinder block 32a and a cylinder head 32b. A piston is housed in the cylinder block 32a. A valve-actuating mechanism is disposed in the cylinder head 32*b*. The cylinder portion 32 has a cylinder axis 32*c* inclined forwardly relative to a vertical line.

A rear portion of the crankcase 31 assumes a transmission case portion 33. A transmission (not depicted) is housed in the transmission case portion 33.

An output of the engine 10 is transmitted from a transmission output shaft 33*a* to the rear wheel 3 via a drive chain 34. The transmission output shaft 33*a* extends from the transmission case portion 33 to the outside in the vehicle width direction.

An exhaust pipe 35 of the engine 10 extends downwardly from a front surface of the cylinder head 32*b*.

A throttle body 36 is connected with a rear surface of the cylinder head 32*b*. The throttle body 36 supplies an intake port of the cylinder head 32*b* with intake air drawn in an air cleaner box (not depicted).

A battery box 38 (electric component), which houses a battery 37, is disposed posterior to the cylinder portion 32 and superior to the transmission case portion 33.

A pair of left and right steps 39, on which the occupant rests his or her feet, is disposed posterior to the pivot support member 19. The steps 39 are supported by a step holder 40, which is mounted on the pivot support member 19.

A shift pedal 41, which is operated by the occupant to operate the transmission of the engine 10, is disposed anterior to either one of the left and right steps 39.

A side stand 42, which is grounded to support the motorcycle 1 in parking, is supported by the pivot support member 19.

Figure 3:
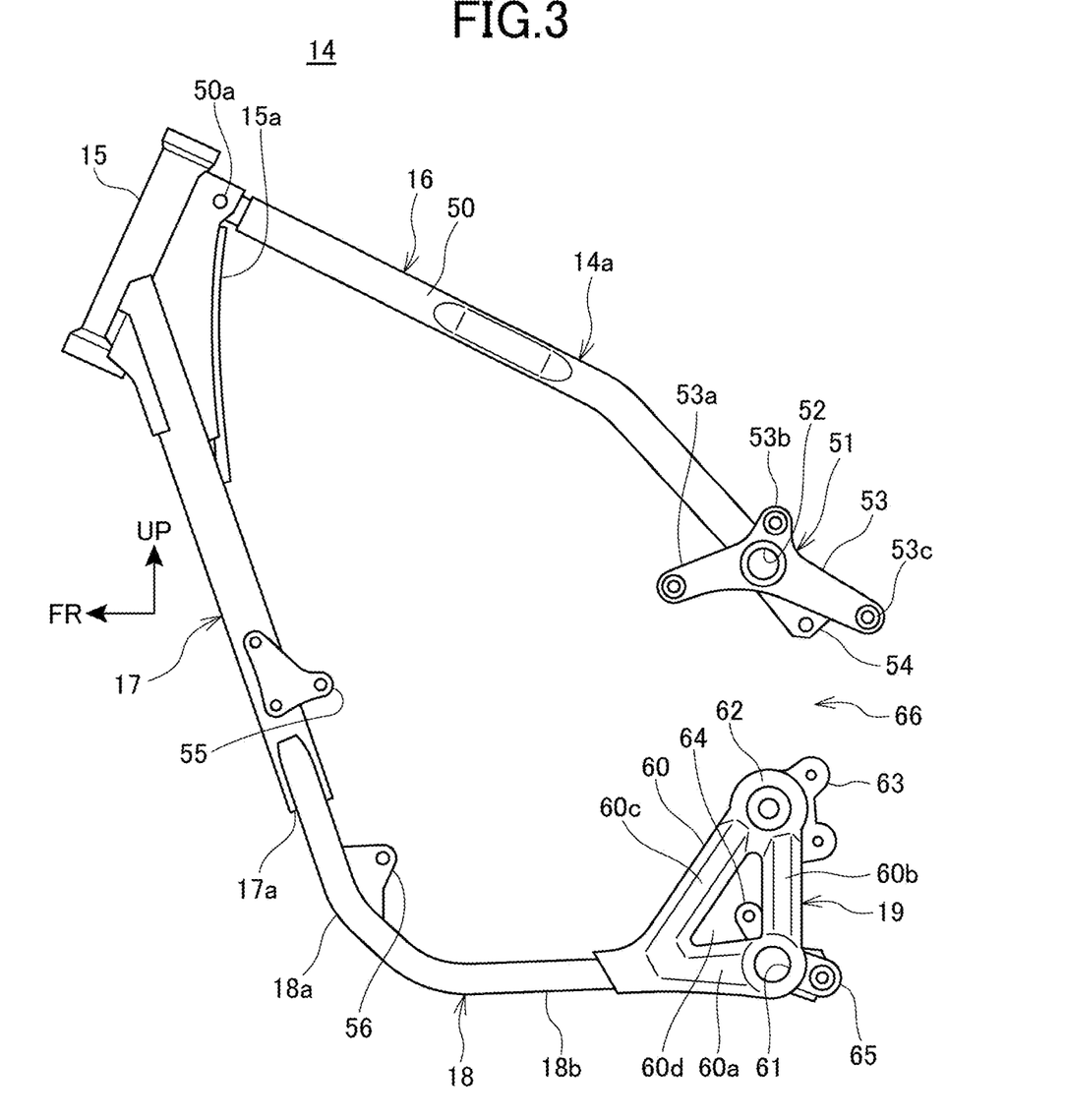
FIG. 3 is a left side elevation view of a front-portion frame.
Figure 4:
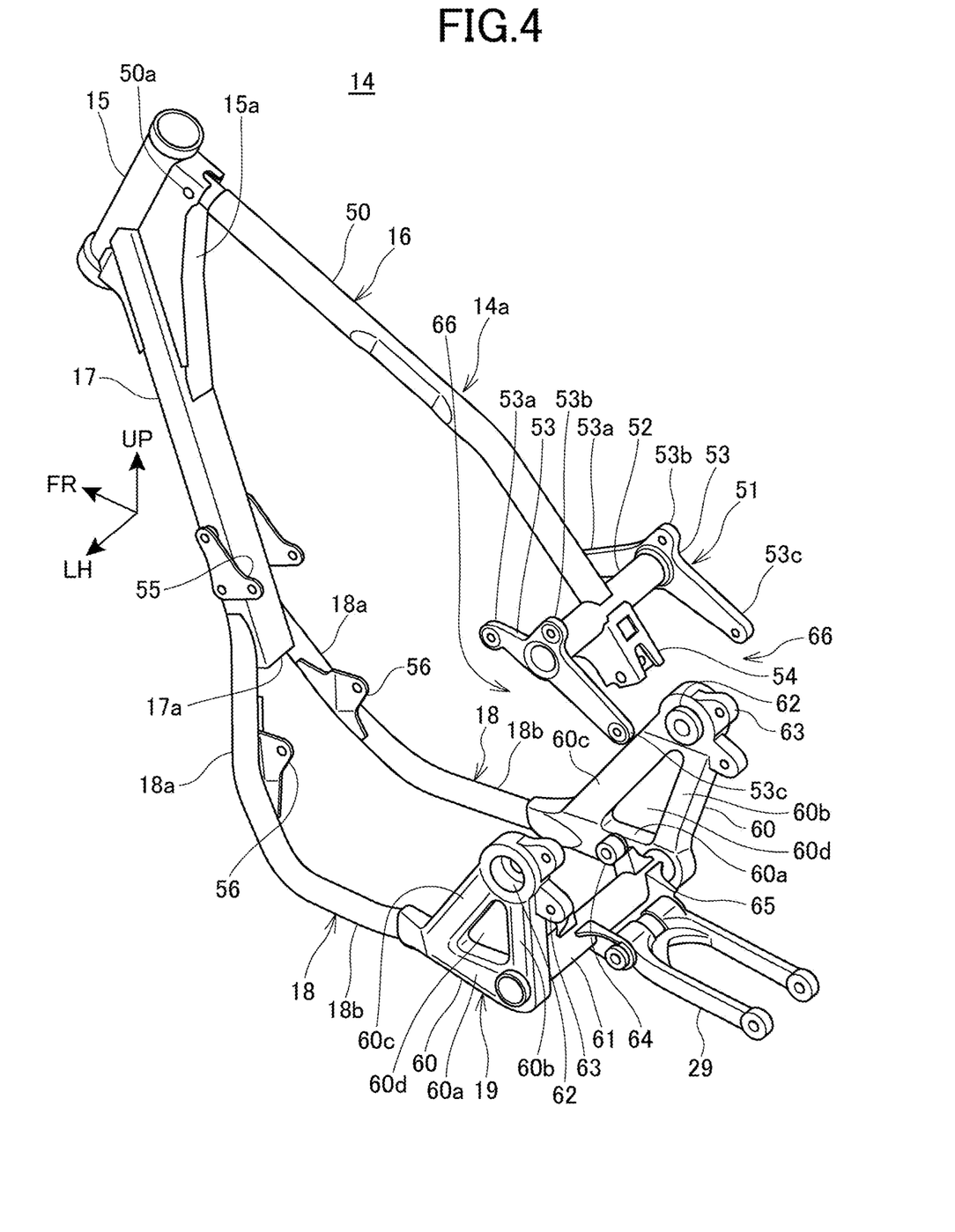
FIG. 4 is a perspective view of the front-portion frame, as viewed from a rear lateral side.
Figure 5:
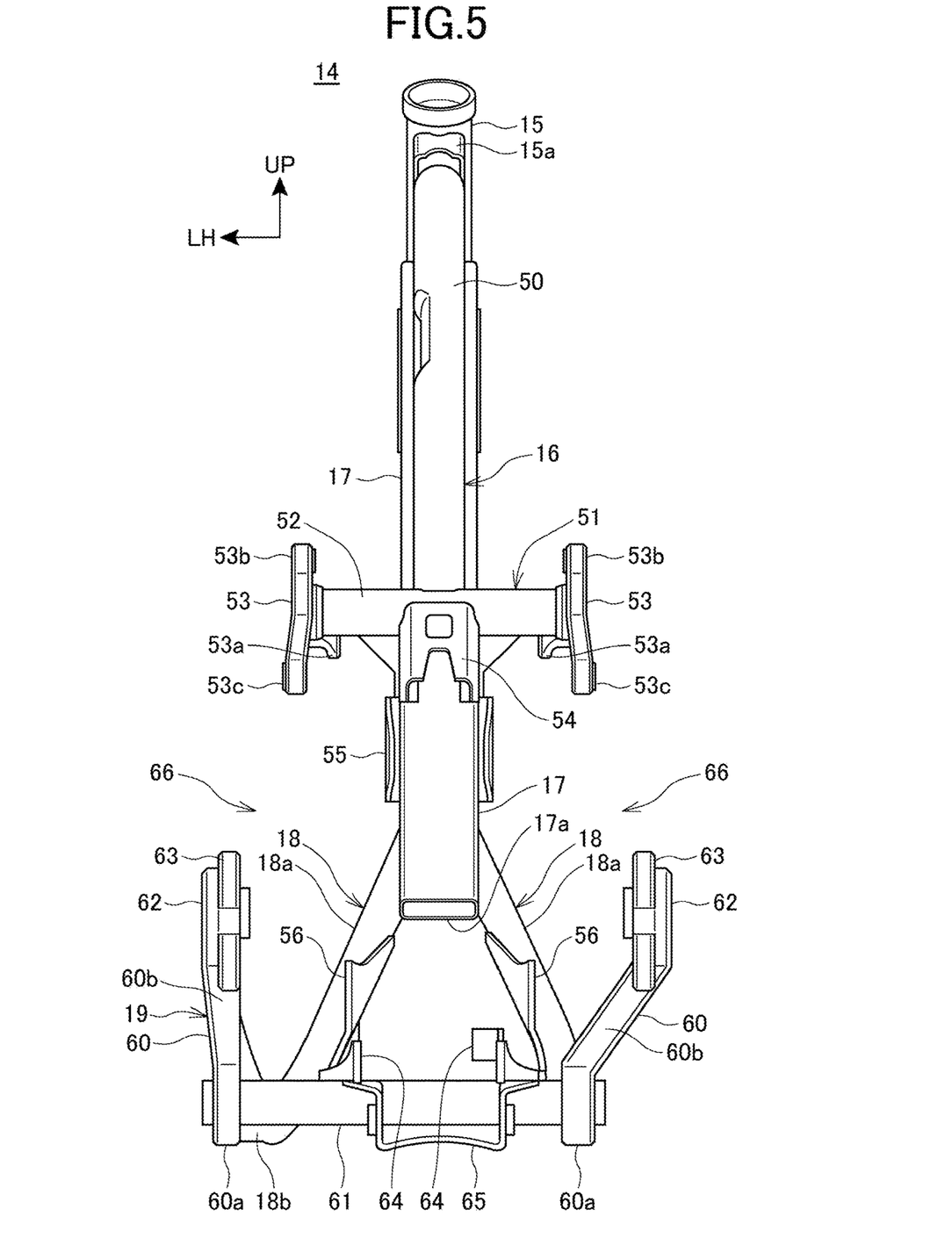
FIG. 5 is an illustration of the front-portion frame, as viewed from a rear.

FIG. 3 is a left side elevation view of the front-portion frame 14. FIG. 4 is a perspective view of the front-portion frame 14, as viewed from a rear lateral side. FIG. 5 is an illustration of the front-portion frame 14, as viewed from the rear.

Reference is made to FIGS. 1 to 5. The head pipe 15 is disposed at a front end of the front-portion frame 14. The head pipe 15 is inclined rearwardly in a vehicle side view. As with the front wheel 2, the head pipe 15 is disposed on a centerline C (FIG. 2), which passes through a center in a vehicle width. The head pipe 15 is provided with a gusset portion 15*a* on a rear surface thereof. The gusset portion 15*a* vertically connects a front end portion of the main frame 16 with a front end portion of the down frame 17.

The main frame 16 includes a main tube 50 and a cross frame portion 51. The main tube 50 extends rearwardly from the head pipe 15. The cross frame portion 51 extends laterally from a rear end of the main tube 50.

The main tube 50 represents a single pipe-shaped frame disposed at the center in the vehicle width. The main tube 50 extends from an upper portion of the head pipe 15 along a path superior to the engine 10 obliquely downwardly toward a position posterior to the engine 10.

The main tube 50 has a front end fixed to an upper portion of the gusset portion 15*a* of the head pipe 15 by a frame fastener 50*a*, which is passed through in the vehicle width direction. The frame fastener 50*a* is, for example, a bolt.

The cross frame portion 51 includes a cross pipe 52, stay portions 53, and a suspension connection portion 54. The cross pipe 52 extends horizontally in the vehicle width direction from a rear end of the main tube 50. The stay portions 53 are disposed on either lateral side of the cross pipe 52. The suspension connection portion 54 extends from a rear surface of the cross pipe 52 downwardly toward the rear.

The stay portions 53 each include a rear upper portion engine fixing portion 53*a* (electric component fixing portion or rear portion engine fixing portion), a seat frame fixing portion 53*b*, and a seat frame fixing portion 53*c*. The rear upper portion engine fixing portion 53*a* extends forwardly from a corresponding lateral end of the cross pipe 52. The seat frame fixing portion 53*b* extends from an outer end of the cross pipe 52 upwardly toward the rear. The seat frame fixing portion 53*c* extends from an outer end of the cross pipe 52 downwardly toward the rear.

The suspension connection portion 54 is provided at the center in the vehicle width direction on the rear surface of the cross pipe 52 and disposed at a rear end of the main frame 16.

The down frame 17 extends from a rear surface of a lower portion of the head pipe 15 along a path anterior to the engine 10 downwardly toward the rear. The down frame 17 represents a single pipe-shaped frame disposed at the center in the vehicle width. The down frame 17 has a lower end 17*a* disposed anterior to the crankcase 31.

A front upper portion engine fixing portion 55 (engine fixing portion) is disposed on each of outer side surfaces of a lower portion of the down frame 17. The front upper portion engine fixing portion 55 extends toward the rear.

The lower frames 18 each include a downward extension 18*a* and a rearward extension 18*b*. The downward extension 18*a* extends from an outer side surface of a lower portion of the down frame 17 downwardly toward the rear. The rearward extension 18*b* extends from a lower end of the downward extension 18*a* toward the rear.

The downward extensions 18*a* extend downwardly along respective paths anterior to the crankcase 31. The distance in the vehicle width direction between the left and right downward extensions 18*a* increases at distances closer to the ground.

The downward extensions 18*a* are each provided with a front lower portion engine fixing portion 56 (engine fixing portion). The front lower portion engine fixing portion 56 extends toward the rear.

The rearward extensions 18*b* extend along respective paths inferior to the engine 10 toward the rear. Specifically, the rearward extensions 18*b* extend toward the rear along respective paths beside a lower end portion of the crankcase 31.

The pivot support member 19 includes a pair of left and right pivot plates 60 and a cross member 61. The pivot plates 60 extend upwardly from respective rear end portions of the lower frames 18. The cross member 61 connects the pivot plates 60 in the vehicle width direction.

In a vehicle side view, the pivot plates 60 extend from the respective lower frames 18 upwardly to positions of the pivot shaft 27.

A pivot support portion 62 is disposed at an upper end portion of each of the pivot plates 60. The pivot support portion 62 supports the pivot shaft 27. The pivot support portion 62 is a hole in which the pivot shaft 27 fits.

Specifically, the pivot plates 60 each include a bottom portion 60*a*, a rear-side strut portion 60*b*, and a front-side strut portion 60*c*. The bottom portion 60*a* extends toward the rear from the rearward extension 18*b* of the lower frame 18. The rear-side strut portion 60*b* extends from a rear end of the bottom portion 60*a* substantially vertically. The front-side strut portion 60*c* extends upwardly toward the rear from a front end of the bottom portion 60*a* along a path on an outer lateral side of the transmission case portion 33 and is connected with an upper end of the rear-side strut portion 60*b*.

The pivot plate 60 includes a lightening portion 60d. The lightening portion 60d is defined by the bottom portion 60a, the front-side strut portion 60c, and the rear-side strut portion 60b.

A step support portion 63 is disposed at a rear portion of an upper end portion of the pivot plate 60. The step support portion 63 extends toward the rear. The step holder 40 is fastened to the step support portion 63.

The side stand 42 is mounted on the pivot plate 60 on a first side (left-hand side).

The pivot support portion 62 is disposed at a portion at which an upper end portion of the front-side strut portion 60c is connected with an upper end portion of the rear-side strut portion 60b.

The pivot support portion 62 is located, in a vehicle side view, between a rear surface of the transmission case portion 33 and the rear suspension 28. The pivot support portion 62 is located inferior to an upper end portion 33b of the transmission case portion 33 and the upper end 28a of the rear suspension 28.

As depicted in FIG. 5, the left and right pivot support portions 62 are located outside the left and right stay portions 53 of the main frame 16 in the vehicle width direction.

The cross member 61 of the pivot support member 19 connects rear end portions of the bottom portions 60a of the pivot plates 60 in the vehicle width direction.

Rear lower portion engine fixing portions 64 (engine fixing portions), which extend upwardly toward the front, are disposed at a front portion of the cross member 61. A link connection stay 65, which extends to the rear, is disposed at a rear portion of the cross member 61.

The swing arm 12 is journaled by the pivot shaft 27 as follows. Specifically, the arm portions 12a and 12b have front end portions disposed inside the left and right pivot support portions 62 and the pivot shaft 27 is passed through the pivot support portions 62. The pivot shaft 27 is passed through in the vehicle width direction at a position posterior to a rear surface of the transmission case portion 33.

The front-portion frame 14 includes a frame-shaped portion 14a. In a vehicle side view, the frame-shaped portion 14a surrounds the engine 10 with the head pipe 15, the main frame 16, the down frame 17, the lower frame 18, and the pivot support member 19. The front-portion frame 14 generally assumes the frame-shaped portion 14a.

The engine 10 is disposed, in a vehicle side view, inside the frame-shaped portion 14a of the front-portion frame 14 and is fixed to the front-portion frame 14 by the front upper portion engine fixing portion 55, the front lower portion engine fixing portion 56, the rear upper portion engine fixing portion 53a, and the rear lower portion engine fixing portion 64.

Specifically, the front upper portion engine fixing portion 55 is fastened to a front end portion of the cylinder block 32a. The front lower portion engine fixing portion 56 is fastened to a front surface portion of the crankcase 31. The rear upper portion engine fixing portion 53a is fastened to an upper surface portion of the transmission case portion 33. The rear lower portion engine fixing portion 64 is fastened to a lower portion of the transmission case portion 33.

The front-portion frame 14 has an open portion 66 at a rear portion thereof. The open portion 66 is an opening in a vehicle side view in the frame-shaped portion 14a, which surrounds the engine 10. The front-portion frame 14 is discontinuous at the open portion 66, at which the frame-shaped portion 14a disposed outside the engine 10 is discontinuous in a vehicle side view.

The open portion 66 is disposed between the rear end portion of the main frame 16 and the upper end portion of the pivot support member 19 and located posterior to the transmission case portion 33 of the engine 10. In the open portion 66, no frame member connects between the cross frame portion 51 at the rear end portion of the main frame 16 and the pivot support portion 62 at the upper end portion of the pivot support member 19. Specifically, the rear end portion of the main frame 16 is spaced vertically apart from the upper end portion of the pivot support member 19.

Specifically, in a vehicle side view, the rear end portion of the main frame 16 extends downwardly to a position in height of the upper end portion 33b of the transmission case portion 33, posterior to the transmission case portion 33. The pivot support portion 62 of the pivot support member 19 is located immediately below the rear end portion of the main frame 16, posterior to the transmission case portion 33. Specifically, the open portion 66 is disposed posterior to the transmission case portion 33 and superior to the pivot support portion 62.

In the motorcycle 1, the rear end portion of the main frame 16 is not connected with the pivot support member 19 by any frame member and the front-portion frame 14 has the open portion 66, so that rigidity of the front-portion frame 14 can be reduced to some extent. Favorable rigidity balance of the vehicle body frame F can thus be achieved. The foregoing can achieve, for example, the following effects. Specifically, agile handling characteristics can be obtained during running of the motorcycle 1 at low to medium speeds. Reduction in weight of the vehicle body frame F can be achieved for the frame member that connects between the rear end portion of the main frame 16 and the pivot support member 19 and that is eliminated.

Additionally, the open portion 66 contributes to a narrower width of a portion of the front-portion frame 14 disposed inferior to the seat 13. Thus, the front-portion frame 14 is less likely to hamper the occupant sitting in the seat 13 from reaching his or her feet to the ground, thus providing greater ease of reach of feet to the ground.

The upper end 28a of the rear suspension 28 is connected with the suspension connection portion 54 at the rear end portion of the main frame 16.

The lower end 28b of the rear suspension 28 is connected with the link connection stay 65 of the pivot support member 19 via the link 29.

Additionally, the lower end 28b of the rear suspension 28 is connected with the pivot support portion 62 of the pivot support member 19 via the link 29, the swing arm 12, and the pivot shaft 27.

Specifically, the main frame 16 and the pivot support member 19 are not directly connected by a frame member of the front-portion frame 14, but are indirectly connected via the rear suspension 28, the link 29, the swing arm 12, and the pivot shaft 27.

A load on the rear suspension 28 is transmitted to the main frame 16 and the pivot support member 19 via the upper end 28a and the lower end 28b. Thus, a load of vertical motion or torsion from the side of the rear suspension 28 can be efficiently borne by the front-portion frame 14, so that favorable rigidity balance of the vehicle body frame F can be achieved.

The engine 10 is supported mainly by the down frame 17, the lower frame 18, and the pivot support member 19 via the front upper portion engine fixing portion 55, the front lower portion engine fixing portion 56, and the rear lower portion engine fixing portion 64. Thus, the weight of the engine 10 borne by the main frame 16 can be reduced and the main frame 16 can be formed as a single pipe. As a result, rigidity of the main frame 16 can be reduced to some extent and favorable rigidity balance of the vehicle body frame F can be achieved.

Because one main frame 16 is disposed at the center in the vehicle width, the upper portion of the front-portion frame 14 can be formed to be slim in the vehicle width direction. Thus, the motorcycle 1 provides greater ease of reach of feet to the ground and, for example, a degree of freedom can be enhanced in layout of parts to be disposed superior to the main frame 16, such as a fuel tank. Additionally, reduction in weight of the main frame 16 can be achieved.

The main frame 16, which has the front end portion fastened to the head pipe 15 by the frame fastener 50a, can be independently removed from the head pipe 15. Thus, the main frame 16 can be mounted on the head pipe 15, for example, after the engine 10 and other parts have been fixed to the down frame 17, the lower frames 18, and the pivot support member 19. Thus, the main frame 16 does not serve as hindrance for work and favorable assemblability of parts including the engine 10 can be achieved.

As depicted in FIGS. 1 and 2, an arm-shaped operation input portion 33d is disposed on a side surface portion of the transmission case portion 33. An operation of the shift pedal 41 is applied to the operation input portion 33d. The operation input portion 33d forms part of the transmission. The operation input portion 33d is located between the pivot plate 60 and the stay portion 53 in the vehicle width direction and disposed in the open portion 66 in a vehicle side view.

The operation input portion 33d is connected with the shift pedal 41 via a change rod 68. The change rod 68 extends, in a vehicle side view, from the operation input portion 33d linearly downwardly toward the rear by way of the open portion 66 and is connected with a rear end portion of the shift pedal 41. In the vehicle width direction, the change rod 68 passes through a path inside the pivot plate 60 and outside the swing arm 12.

Because the change rod 68 passes through the open portion 66 as described above, the front-portion frame 14 is less likely to hamper disposition of the change rod 68, so that the change rod 68 can be shaped and disposed simply.

The seat frame 20 has a front end portion superposed from the outside in the vehicle width direction on the seat frame fixing portions 53b and 53c of the cross frame portion 51, which extends laterally outwardly from the rear end portion of the main frame 16, and fastened to the seat frame fixing portions 53b and 53c. Thus, the main frame 16 can have a wider width even with a configuration of a single main frame 16 disposed at the center in the vehicle width.

As depicted in FIG. 2, the cross frame portion 51 and the seat frame 20 are located inside outer end portions 10a and 10b in the vehicle width direction of the crankcase 31 of the engine 10 and fall within a width of the engine 10. Thus, the seat frame 20 can be built to be slim in the vehicle width direction and the motorcycle 1 can provide greater ease of reach of feet to the ground.

Moreover, the seat frame 20 falls within a width of the cylinder portion 32, which has a width smaller than a width of the crankcase 31. Thus, the vehicle body frame F can be built to be slim in the vehicle width direction.

Reference is made to FIGS. 1 and 2. The battery box 38 is disposed posterior to the cylinder portion 32 and between the rear portion of the main frame 16 and the upper surface of the transmission case portion 33. This configuration results in the battery box 38 being surrounded by the engine 10 and the main frame 16, so that the battery box 38 can be effectively protected.

An engine-side fixing portion 33c (FIG. 1) is disposed in the upper surface of the transmission case portion 33. The battery box 38 is fixed to the engine-side fixing portion 33c. The battery box 38 is fastened to the engine-side fixing portion 33c and the rear upper portion engine fixing portion 53a of the main frame 16. Specifically, the rear upper portion engine fixing portion 53a functions also as an electric component fixing portion for fixing the battery box 38. This eliminates the need for a fixing portion dedicated to the battery box 38.

As described above, in accordance with the first embodiment of the present invention, the vehicle body frame structure for the motorcycle 1 includes the engine 10, the vehicle body frame F, which supports the engine 10, and the swing arm 12, which supports the rear wheel 3. The vehicle body frame F includes the head pipe 15, the main frame 16, which extends from the head pipe 15 toward the rear of the vehicle along a path superior to the engine 10, the down frame 17, which extends from the head pipe 15 downwardly along a path anterior to the engine 10, the lower frames 18, which extend from the lower portion of the down frame 17 toward the rear of the vehicle along a path inferior to the engine 10, and the pivot support member 19, which extends from the rear portions of the lower frames 18 upwardly up to a position of the pivot shaft 27, which rotatably supports the swing arm 12. The pivot support member 19 includes the pivot support portions 62, which support the pivot shaft 27.

Through the foregoing configurations, the vehicle body frame F includes the pivot support member 19, which includes the pivot support portions 62, and the pivot support member 19 extends from the rear portions of the lower frames 18 upwardly to the position of the pivot shaft 27. This arrangement results in the pivot support member 19 not being connected with the vehicle body frame F superior to the pivot support member 19 and rigidity of the vehicle body frame F can be reduced to some extent. Favorable rigidity balance of the vehicle body frame F can thus be achieved. Additionally, weight of the vehicle body frame F can be reduced.

The vehicle body frame structure further includes the rear suspension 28, which suspends the swing arm 12 on the vehicle body frame F, and the rear suspension 28 has the lower end 28b supported by the pivot support member 19 via the link 29 and has the upper end 28a supported by the rear end portion of the main frame 16. Through the foregoing configurations, a load on the side of the lower end 28b of the rear suspension 28 is transmitted to the pivot support member 19 via the link 29 and a load on the side of the upper end 28a of the rear suspension 28 is transmitted to the rear end portion of the main frame 16. Thus, a load of vertical motion or torsion from the side of the rear suspension 28 can be efficiently borne by the vehicle body frame F, so that favorable rigidity balance of the vehicle body frame F can be achieved.

The main frame 16 is a single frame extending from the head pipe 15 and the upper end 28a of the rear suspension 28 is supported by the rear end portion of the main frame 16. Through the foregoing configurations, because the main frame 16 is a single part, the vehicle body frame F can be formed to be slim in the vehicle width direction. Additionally, the load on the side of the upper end 28a of the rear suspension 28 can be directly transmitted to the single main frame 16, so that favorable response of the vehicle body frame F to the load can be achieved.

Additionally, the front upper portion engine fixing portion 55, the front lower portion engine fixing portion 56, and the rear lower portion engine fixing portions 64 are provided as the engine fixing portions to which the engine 10 is fixed for the down frame 17, the lower frames 18, and the pivot support member 19, respectively. Through the foregoing configurations, because weight of the engine 10 is borne by the down frame 17, the lower frames 18, and the pivot support member 19, the position of a center of deflection when the vehicle body frame F is flexed by the load can be disposed at an even lower position, so that the center of gravity of the motorcycle 1 can be lowered when the vehicle body frame F is flexed. The load borne by the main frame 16 can also be reduced and the degree of freedom in designing the main frame 16 can be enhanced.

The vehicle body frame structure further includes the rear upper portion engine fixing portion 53a, to which the battery box 38 is fixed, disposed at the rear portion of the main frame 16 and the battery box 38 is surrounded by the engine 10 and the main frame 16. Through the foregoing configurations, the battery box 38 can be supported by the main frame 16 via the rear upper portion engine fixing portion 53a and the battery box 38 can be protected by the main frame 16 and the engine 10.

The engine 10 further has the engine-side fixing portion 33c, to which the battery box 38 is fixed. Through the foregoing configuration, the battery box 38 can be rigidly fixed by the engine-side fixing portion 33c, disposed in the engine 10.

The vehicle body frame structure further includes the seat frame 20, which extends from the rear end portion of the main frame 16 toward the rear of the vehicle, the main frame 16 includes the cross frame portion 51, which extends laterally and outwardly and which is disposed at the rear end portion, and the seat frame 20 is connected with the cross frame portion 51. Through the foregoing configurations, because the seat frame 20 is connected with the cross frame portion 51, which extends laterally and outwardly from the rear end portion of the main frame 16, the seat frame 20 can have a certain lateral width even with the main frame 16 built to be slim.

The cross frame portion 51 and the seat frame 20 fall within a width of the engine 10 in a plan view. Through the foregoing configuration, the vehicle body frame F can be built to have a slim width and the motorcycle 1 can provide greater ease of reach of feet to the ground.

The vehicle body frame structure further includes the rear upper portion engine fixing portion 53a, to which the engine 10 is fixed and which is disposed at the cross frame portion 51. Through the foregoing configuration, the engine 10 can be fixed via the rear upper portion engine fixing portion 53a, using the cross frame portion 51, which connects the seat frame 20 with the main frame 16.

The vehicle body frame F includes the frame-shaped portion 14a, which surrounds the engine 10 in a vehicle side view, and the frame-shaped portion 14a has the open portion 66, which represents an opening between the rear end portion of the main frame 16 and the upper end portion of the pivot support member 19 in the vehicle side view. Through the foregoing configurations, the vehicle body frame F, which includes the frame-shaped portion 14a surrounding the engine 10 in the vehicle side view, can flex to some extent to achieve favorable rigidity balance, because the frame-shaped portion 14a is open between the rear end portion of the main frame 16 and the upper end portion of the pivot support member 19. Additionally, the open portion 66 contributes to reduction in weight of the vehicle body frame F and to a slim shape at the open portion 66 in the vehicle body frame F. The motorcycle 1 can provide greater ease of reach of feet to the ground.

The rear end portion of the main frame 16 extends downwardly up to the position in height of the upper end portion 33b of the transmission case portion 33, disposed at the rear portion of the engine 10. Through the foregoing configurations, the vehicle body frame F has an open portion between the main frame 16, which extends up to the position in height of the upper end portion 33b of the transmission case portion 33, and the pivot support member 19, which extends upwardly toward the position of the pivot shaft 27. As a result, the portion between the position in height of the upper end portion 33b of the transmission case portion 33 and the position of the pivot shaft 27 can be formed to be slim and reduction in weight of the vehicle body frame F can be achieved.

Additionally, the change rod 68, which connects the operation input portion 33d of the transmission of the engine 10 with the shift pedal 41, passes through the open portion 66 in a vehicle side view. Through the foregoing configuration, because of the change rod 68 passing through the open portion 66 in the vehicle body frame F, the vehicle body frame F is less likely to hamper disposition of the change rod 68, so that the change rod 68 can be disposed easily.

Second Embodiment

A second embodiment to which the present invention is applied will be described below with reference to FIG. 6. It is noted that identical reference symbols are used to denote identical or substantially identical components between the first and second embodiments.

In the second embodiment, a support structure for the battery box 38 differs from the support structure for the battery box 38 in the first embodiment.

Figure 6:
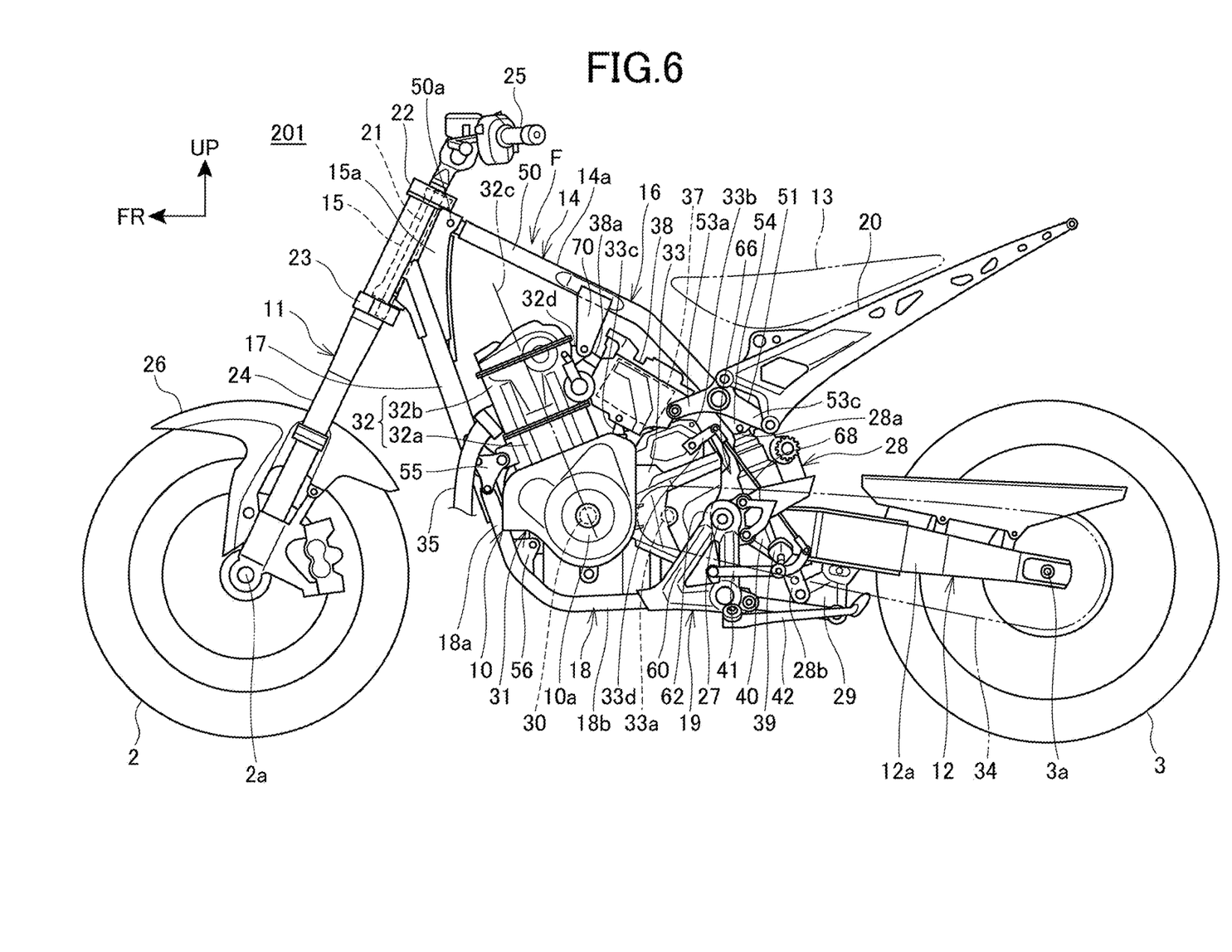
FIG. 6 is a left side elevation view of a motorcycle according to a second embodiment of the present invention.

FIG. 6 is a left side elevation view of a motorcycle 201 according to the second embodiment of the present invention.

The motorcycle 201 includes an upper portion fixing portion 70. The upper portion fixing portion 70 extends downwardly from the main tube 50 of the main frame 16.

The engine 10 includes a fixing portion 32d at a rear portion of the cylinder head 32b, which represents an upper portion of the engine 10. The cylinder portion 32 is supported on the main frame 16 by the upper portion fixing portion 70 being fastened to the fixing portion 32d.

The battery box 38 includes a mounting tab 38a. The mounting tab 38a extends toward the front. The battery box 38 is fixed to the upper portion fixing portion 70 by the mounting tab 38a being fastened jointly with the fixing portion 32d to the upper portion fixing portion 70 on the main frame 16.

The motorcycle 201 in the second embodiment includes the upper portion fixing portion 70, which connects the main frame 16 with the cylinder head 32b, and the battery box 38 is fixed to the upper portion fixing portion 70. Through the foregoing configurations, the battery box 38 can be fixed in place through a simple structure using the upper portion fixing portion 70, which connects the cylinder head 32b with the vehicle body frame F.

While the present invention has been particularly described with reference to the first and second embodiments, it will be understood that the embodiments are illustrative only and are not intended to limit the present invention.

While the motorcycle 1 exemplifies the saddle riding vehicle in the first and second embodiments described above, the invention is not limited thereto. The invention is also applicable to three-wheel saddle riding vehicles including two front or rear wheels and four-or-more-wheel saddle riding vehicles.

DESCRIPTION OF REFERENCE SYMBOLS 1, 201 Motorcycle (saddle riding vehicle)
3 Rear wheel
10 Engine
12 Swing arm
14a Frame-shaped portion
15 Head pipe
16 Main frame
17 Down frame
18 Lower frame
19 Pivot support member
20 Seat frame
27 Pivot shaft
28 Rear suspension
28a Upper end
28b Lower end
29 Link
33 Transmission case portion
33b Upper end portion
33c Engine-side fixing portion
33d Operation input portion (transmission)
38 Battery box (electric component)
41 Shift pedal
51 Cross frame portion
53a Rear upper portion engine fixing portion (rear portion engine fixing portion, electric component fixing portion)
55 Front upper portion engine fixing portion (engine fixing portion)
56 Front lower portion engine fixing portion (engine fixing portion)
62 Pivot support portion
64 Rear lower portion engine fixing portion (engine fixing portion)
66 Open portion
68 Change rod
70 Upper portion fixing portion
F Vehicle body frame

The invention claimed is:

1. A vehicle body frame structure for a saddle riding vehicle, including an engine, a vehicle body frame that supports the engine, and a swing arm that supports a rear wheel, wherein
the vehicle body frame includes:
a head pipe;
a main frame that extends from the head pipe toward a rear of the vehicle along a path superior to the engine;
a down frame that extends from the head pipe downwardly along a path anterior to the engine;
a lower frame that extends from a lower portion of the down frame toward the rear of the vehicle along a path inferior to the engine;
a pivot support member that extends from a rear portion of the lower frame upwardly up to a position of a pivot shaft that rotatably supports the swing arm; and
a rear suspension that suspends the swing arm on the vehicle body frame,
the pivot support member includes a pivot support portion that supports the pivot shaft,
the vehicle body frame includes a frame-shaped portion that surrounds the engine in a vehicle side view, and
a rear end of the main frame is spaced vertically apart from an upper end of the pivot support member, whereby the frame-shaped portion has an open portion that represents an opening between the rear end of the main frame and the upper end of the pivot support member in the vehicle side view, the rear suspension has a lower end supported by the pivot support member via a link and an upper end supported by the rear end of the main frame.

2. The vehicle body frame structure for a saddle riding vehicle according to claim 1, wherein
the main frame is a single frame extending from the head pipe, and the upper end of the rear suspension is supported by the rear end portion of the main frame.

3. The vehicle body frame structure for a saddle riding vehicle according to claim 1, further comprising:
engine fixing portions to which the engine is fixed, disposed in the down frame, the lower frame, and the pivot support member, individually.

4. The vehicle body frame structure for a saddle riding vehicle according to claim 1, further comprising:
an electric component fixing portion to which an electric component is fixed, disposed at a rear portion of the main frame, wherein
the electric component is surrounded by the engine and the main frame.

5. The vehicle body frame structure for a saddle riding vehicle according to claim 4, wherein
the engine has an engine-side fixing portion to which the electric component is fixed.

6. The vehicle body frame structure for a saddle riding vehicle according to claim 4, further comprising:
an upper portion fixing portion that connects the vehicle body frame with an upper portion of the engine, wherein
the electric component is fixed to the upper portion fixing portion.

7. The vehicle body frame structure for a saddle riding vehicle according to claim 1, further comprising:
a seat frame that extends from a rear end portion of the main frame toward the rear of the vehicle, wherein
the main frame includes a cross frame portion that extends laterally and outwardly and that is disposed at the rear end portion, and
the seat frame is connected with the cross frame portion.

8. The vehicle body frame structure for a saddle riding vehicle according to claim 7, wherein
the cross frame portion and the seat frame fall within a width of the engine in a plan view.

9. The vehicle body frame structure for a saddle riding vehicle according to claim 7, further comprising:
a rear portion engine fixing portion to which the engine is fixed, disposed at the cross frame portion.

10. The vehicle body frame structure for a saddle riding vehicle according to claim 1, wherein
the rear end portion of the main frame extends up to a position in height of an upper end portion of a transmission case portion disposed at a rear portion of the engine.

11. The vehicle body frame structure for a saddle riding vehicle according to claim 1, wherein
a change rod that connects a transmission of the engine with a shift pedal passes through the open portion in a vehicle side view.

12. A vehicle body frame structure for a saddle riding vehicle, including an engine, a vehicle body frame that supports the engine, and a swing arm that supports a rear wheel, wherein
the vehicle body frame includes:
a head pipe;
a main frame that extends from the head pipe toward a rear of the vehicle along a path superior to the engine;
a down frame that extends from the head pipe downwardly along a path anterior to the engine;
a lower frame that extends from a lower portion of the down frame toward the rear of the vehicle along a path inferior to the engine; and
a pivot support member that extends from a rear portion of the lower frame upwardly up to a position of a pivot shaft that rotatably supports the swing arm
the pivot support member includes a pivot support portion that supports the pivot shaft,
the vehicle body frame further comprises:
an electric component fixing portion to which an electric component is fixed, disposed at a rear portion of the main frame,
the electric component is surrounded by the engine and the main frame,
the vehicle body frame structure further comprises:
an upper portion fixing portion that connects the vehicle body frame with an upper portion of the engine, and
the electric component is fixed to the upper portion fixing portion.

13. A vehicle body frame structure for a saddle riding vehicle, including an engine, a vehicle body frame that supports the engine, and a swing arm that supports a rear wheel, wherein
the vehicle body frame includes:
a head pipe;
a main frame that extends from the head pipe toward a rear of the vehicle along a path superior to the engine;
a down frame that extends from the head pipe downwardly along a path anterior to the engine;
a lower frame that extends from a lower portion of the down frame toward the rear of the vehicle along a path inferior to the engine; and
a pivot support member that extends from a rear portion of the lower frame upwardly up to a position of a pivot shaft that rotatably supports the swing arm,
the pivot support member includes a pivot support portion that supports the pivot shaft,
the vehicle body frame structure further comprises:
a seat frame that extends from a rear end portion of the main frame toward the rear of the vehicle, wherein
the main frame includes a cross frame portion that extends laterally and outwardly and that is disposed at the rear end portion,
the seat frame is connected with the cross frame portion, and
the cross frame portion and the seat frame fall within a width of the engine in a plan view.

14. A vehicle body frame structure for a saddle riding vehicle, including an engine, a vehicle body frame that supports the engine, and a swing arm that supports a rear wheel, wherein
the vehicle body frame includes:
a head pipe;
a main frame that extends from the head pipe toward a rear of the vehicle along a path superior to the engine;
a down frame that extends from the head pipe downwardly along a path anterior to the engine;
a lower frame that extends from a lower portion of the down frame toward the rear of the vehicle along a path inferior to the engine; and
a pivot support member that extends from a rear portion of the lower frame upwardly up to a position of a pivot shaft that rotatably supports the swing arm,
the pivot support member includes a pivot support portion that supports the pivot shaft,
the vehicle body frame includes a frame-shaped portion that surrounds the engine in a vehicle side view,
the frame-shaped portion has an open portion that represents an opening between a rear end portion of the main frame and an upper end portion of the pivot support member in the vehicle side view, and
the rear end portion of the main frame extends up to a position in height of an upper end portion of a transmission case portion disposed at a rear portion of the engine.

15. A vehicle body frame structure for a saddle riding vehicle, including an engine, a vehicle body frame that supports the engine, and a swing arm that supports a rear wheel, wherein
the vehicle body frame includes:
a head pipe;
a main frame that extends from the head pipe toward a rear of the vehicle along a path superior to the engine;
a down frame that extends from the head pipe downwardly along a path anterior to the engine;
a lower frame that extends from a lower portion of the down frame toward the rear of the vehicle along a path inferior to the engine; and
a pivot support member that extends from a rear portion of the lower frame upwardly up to a position of a pivot shaft that rotatably supports the swing arm,
the pivot support member includes a pivot support portion that supports the pivot shaft,
the vehicle body frame includes a frame-shaped portion that surrounds the engine in a vehicle side view,
the frame-shaped portion has an open portion that represents an opening between a rear end portion of the main frame and an upper end portion of the pivot support member in the vehicle side view, and
a change rod that connects a transmission of the engine with a shift pedal passes through the open portion in a vehicle side view.

* * * * *